United States Patent
Hurley

(10) Patent No.: US 8,335,418 B2
(45) Date of Patent: *Dec. 18, 2012

(54) CABLES WITH BEND INSENSITIVE OPTICAL FIBERS

(75) Inventor: William C. Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,254

(22) Filed: Jun. 12, 2012

(65) Prior Publication Data

US 2012/0251060 A1     Oct. 4, 2012

Related U.S. Application Data

(63) Continuation of application No. 12/636,044, filed on Dec. 11, 2009, now Pat. No. 8,224,140.

(51) Int. Cl.
*G02B 6/44* (2006.01)
(52) U.S. Cl. .......... 385/104; 385/102; 385/103
(58) Field of Classification Search ........... 385/100–114
See application file for complete search history.

(56) References Cited

U.S. PATENT DOCUMENTS

| | | | |
|---|---|---|---|
| 4,836,642 A | 6/1989 | Matsumoto et al. | 385/145 |
| 4,946,902 A | 8/1990 | Bekiarian et al. | 525/326.2 |
| 5,076,659 A | 12/1991 | Bekiarian et al. | 385/143 |
| 5,260,957 A | 11/1993 | Hakimi et al. | 372/39 |
| 5,558,669 A | 9/1996 | Reynard | 606/15 |
| 5,561,729 A | 10/1996 | Parris | 385/113 |
| 5,591,160 A | 1/1997 | Reynard | 606/15 |
| 5,881,200 A | 3/1999 | Burt | 385/142 |
| 6,494,496 B1 | 12/2002 | Sweeney | 285/115 |
| 6,577,801 B2 | 6/2003 | Broderick et al. | 385/125 |
| 6,710,366 B1 | 3/2004 | Lee et al. | 257/14 |
| 6,771,865 B2 | 8/2004 | Blaszyk et al. | 385/127 |
| 6,801,699 B1 | 10/2004 | Bickham et al. | 385/123 |
| 6,819,850 B2 | 11/2004 | Sillard et al. | 385/127 |
| 6,839,484 B2 | 1/2005 | White | 385/29 |
| 6,952,519 B2 | 10/2005 | Bickham et al. | 385/127 |
| 6,968,107 B2 | 11/2005 | Belardi et al. | 385/127 |

(Continued)

FOREIGN PATENT DOCUMENTS

EP    0867740 A1    9/1998

(Continued)

OTHER PUBLICATIONS

Draka Comteq / Optical Fibre, "BendBright$^{XS}$ Single Mode Optical Fibre", product information sheet, Issue date: Aug. 2006.

(Continued)

*Primary Examiner* — Daniel Petkovsek
(74) *Attorney, Agent, or Firm* — Russell S. Magaziner

(57) ABSTRACT

A fiber optic cable includes a plurality of optical fibers, strength material surrounding the plurality of optical fibers, and a polymer jacket surrounding the strength material. If present, any lay length of the optical fibers is greater than or equal to about 500 mm. If present, any lay length of the strength material is greater than or equal to about 500 mm. When wrapped one turn around a 10 mm diameter mandrel, each of the optical fibers is configured to exhibit a bend-induced optical attenuation of less than 0.5 dB at an 850 nm wavelength.

16 Claims, 3 Drawing Sheets

U.S. PATENT DOCUMENTS

| | | |
|---|---|---|
| 7,043,125 B2 | 5/2006 | Diep et al. .................... 385/123 |
| 7,054,513 B2 | 5/2006 | Herz et al. ....................... 385/12 |
| 7,082,243 B2 | 7/2006 | Bickham et al. .............. 385/127 |
| 7,391,954 B1 | 6/2008 | Castonguay et al. ......... 385/140 |
| 7,397,991 B1 | 7/2008 | Register ........................ 385/102 |
| 8,224,140 B2 * | 7/2012 | Hurley .......................... 385/104 |
| 2003/0026566 A1 | 2/2003 | Diep et al. .................... 385/123 |
| 2003/0103749 A1 | 6/2003 | Kumar et al. ................. 385/127 |
| 2004/0033039 A1 | 2/2004 | Oliveti et al. ................. 385/123 |
| 2004/0253057 A1 | 12/2004 | Tsuchiya et al. ........... 405/183.5 |
| 2005/0013566 A1 | 1/2005 | Storaasli et al. .............. 385/113 |
| 2006/0039664 A1 | 2/2006 | Bickham ....................... 385/127 |
| 2006/0108790 A1 | 5/2006 | Powell et al. .................... 285/45 |
| 2006/0133753 A1 | 6/2006 | Nelson et al. ................. 385/125 |
| 2006/0257086 A1 | 11/2006 | Ohsono et al. ................ 385/123 |
| 2008/0138022 A1 | 6/2008 | Tassone ........................ 385/124 |
| 2008/0145011 A1 | 6/2008 | Register ........................ 385/128 |

FOREIGN PATENT DOCUMENTS

| | | |
|---|---|---|
| EP | 1437612 | 7/2004 |
| EP | 1617243 A1 | 1/2006 |

OTHER PUBLICATIONS

Huntsman "IROGRAN A 78 P 4766", product information sheet, Update: Jul. 2001.

International Telecommunication Union, ITUI-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

The Lubrizol Corporation, Estane Thermoplastic Polyurethanes, Estane 58881 TPU Technical Data Sheet, Jul. 2006, 3 pgs.

Pickrell, et al., "Random Hole Optical Fibers," Proceedings of the SPIE, SPIE, Bellingham, VA, US, vol. 5272, XP002320309, Oct. 28, 2003, pp. 207-215.

Ellis, et al., "Microstructural Analysis of Random Hole Optical Fibers," IEEE, Photonics Technology Letters, IEEE Service Center, Piscataway, NJ, US, vol. 16, No. 2, XP011107303, Feb. 2004, pp. 491-493.

Patent Coorperation Treaty, International Search Report for International Application No. PCT/US2007/025308, May 20, 2008, 14 pages.

* cited by examiner

CABLES WITH BEND INSENSITIVE OPTICAL FIBERS

CROSS-REFERENCE

This application is a continuation of U.S. patent application Ser. No. 12/636,044 filed Dec. 11, 2009, which issued as U.S. Pat. No. 8,224,140 on Jul. 17, 2012, the content of which is relied upon and incorporated herein by reference in its entirety, and the benefit of priority under 35 U.S.C. §120 is hereby claimed.

BACKGROUND

The present disclosure generally relates to fiber optic cables and methods of manufacturing fiber optic cables.

The science of fiber optics is applicable to various fields of technology and is often used for the transmission of communication signals. Individual optical fibers, which each act as a waveguide for directing light from one end of the fiber to the other, can be bundled together to form a fiber optic cable.

Fiber optic cable can be installed outdoors over long distances, either underground or above ground, and can also be installed within buildings. When installed indoors, fiber optic cable may be run through the plenum spaces of buildings alongside HVAC equipment and other utilities. Fiber optic cable may also be run through riser spaces, such as elevator shafts or other spaces within a building.

When installing indoor-type fiber optic cable, it may be necessary at times to bend the cable around corners or other structures in a building. A bent fiber optic cable may cause the light within its optical fibers to be scattered or lost when the bend radius is too small. The scattering or loss of light is referred to herein as optical attenuation.

Stranding the optical fibers in a fiber optic cable is one way to reduce optical attenuation caused by bending a cable. However, the speed at which a fiber optic cable is manufactured may be limited by the stranding.

SUMMARY

The present disclosure describes fiber optic cables and methods of manufacturing fiber optic cables. According to some embodiments disclosed herein, a fiber optic cable may include a group of optical fibers that may not be stranded or may be stranded (e.g., twisted) with a lay length of greater than or equal to about 160 mm. The fiber optic cable may also include strength material surrounding the group of optical fibers, and an extruded polymer jacket surrounding the strength material. The jacket may tightly surround the strength material. Each of the optical fibers (e.g., in isolation) may be configured to exhibit a bend-induced optical delta attenuation of less than or equal to about 0.6 dB when wrapped one turn around a 7.5 mm mandrel.

In some implementations, a method of manufacturing a fiber optic cable comprises stranding a group of optical fibers with a lay length of greater than or equal to about 160 mm. Each optical fiber (e.g., in isolation) may be configured to exhibit a bend-induced attenuation of less than or equal to about 0.6 dB when wrapped one turn around a 7.5 mm mandrel. The method may also include surrounding the plurality of optical fibers with a strength member and extruding a polymer jacket around the strength member.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Some aspects of the present disclosure are directed to fiber optic cables containing a plurality of low attenuation optical fibers, and methods of manufacturing the fiber optic cables. According to various embodiments, the fiber optic cables described herein may include a plurality of optical fibers arranged with little or no stranding or twisting around each other. Strength members (e.g., aramid or other suitable materials), which may be used for strengthening and to protect the optical fibers, can also be arranged with little or no stranding. In accordance with one aspect of this disclosure, the optical fibers and strength members may be substantially parallel to each other along a length of cable.

Figure 2:
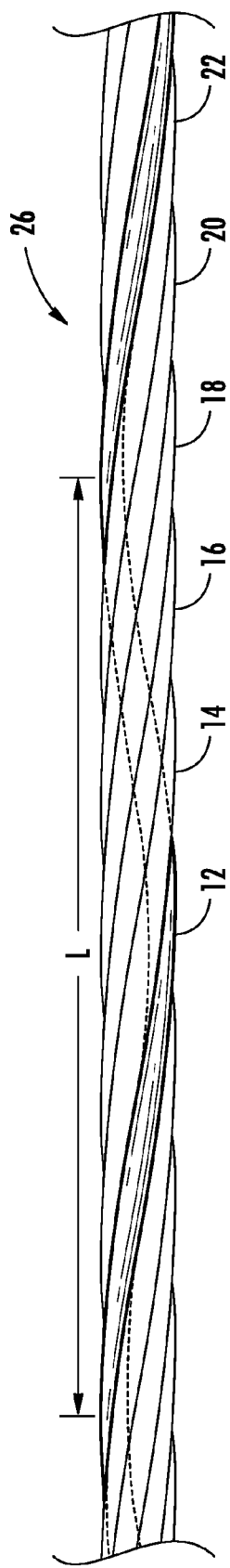
FIG. 2 is an isolated, schematic side view of an indeterminate length of stranded optical fibers of the cable of FIG. 1.
Figure 1:
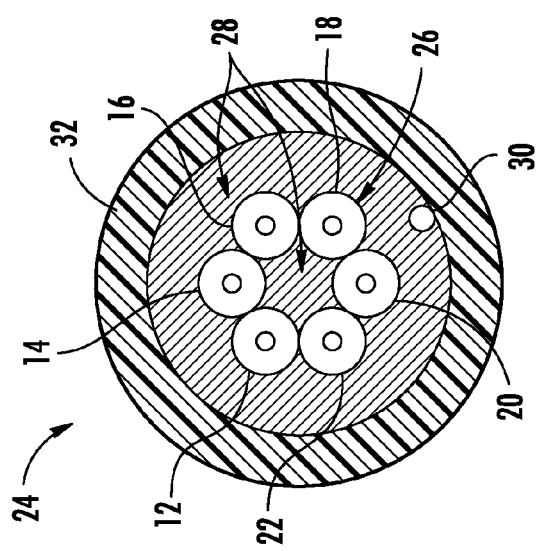
FIG. 1 is a schematic cross-sectional view of a fiber optic cable according to a first embodiment of this disclosure, wherein the cross section is perpendicular to the length of the fiber optic cable.

FIG. 1 is a schematic cross-sectional view of a fiber optic cable 24 according to a first embodiment of this disclosure. The cable 24 includes a group of optical fibers 26 that may not be stranded, or may be stranded with a lay length, such as but not limited to a long lay length, as will be discussed in greater detail below. FIG. 2 is an isolated, schematic side view of an indeterminate length of the group of optical fibers 26 stranded with a lay length, as will be discussed in greater detail below.

In accordance with the first embodiment and as shown in FIG. 1, strength material 28 surrounds the group of optical fibers 26, and a jacket 32 surrounds the strength material 28 and a ripcord 30. The strength material 28 is in a space between the group of optical fibers 26 and the jacket 32. The strength material 28 allows the optical fibers to move to a limited extent within the jacket 32. In accordance with the first embodiment, the strength material 28 may be, or may include, aramid strands that extend along the length of the cable 24, and the aramid strands may be stranded or not stranded. In some embodiments, the strength material 28 not only surrounds the group of optical fibers 26 but may also be positioned in the middle of the group of optical fibers optical fibers 26, as schematically shown in FIG. 1. Other arrangements and other types of strength material 28 are within the scope of this disclosure.

In accordance with the version of the first embodiment shown in FIGS. 1 and 2, the group of optical fibers 26 includes six optical fibers arranged in a circular pattern, namely a first optical fiber 12, a second optical fiber 14, a third optical fiber 16, a fourth optical fiber 18, a fifth optical fiber 20, and a sixth optical fiber 22. In FIG. 2, a visible portion of the first optical fiber 12 is illustrated in a darkened manner to highlight this particular fiber. Hidden portions of the first optical fiber 12 are shown in dashed lines. A dimension referred to as lay length, which is designated by the distance L in FIG. 2, represents a measurement of the distance measured along the length of the central axis of the group of optical fibers 26 in which the optical fibers 12, 14, 16, 18, 20, 22 complete one revolution around the central axis. As illustrated in FIG. 2, the lay length L is measured for a distance of one revolution of the first optical fiber 12 from one peak location to its next peak location.

When the group of optical fibers 26 are stranded, it is typically S-Z stranded (i.e., twisted), such that, along the length of the cable 24, the direction of twist changes from one direction, i.e., the "S" direction, to the opposite direction, i.e., the "Z" direction, and continues to alternate between these two directions along the length of the cable 24.

Whereas the group of optical fibers 26 is shown as being stranded in FIG. 2, the group of optical fibers 26 is not required to be stranded. That is and in accordance with the first embodiment of this disclosure, the lay length of the group of optical fibers 26 may be in a range that extends to infinity (i.e., in some versions of the first embodiment the group of optical fibers 26 are not stranded). In accordance with one aspect of the first embodiment, each of the optical fibers of the group of optical fibers 26 (e.g., the optical fibers 12, 14, 16, 18, 20, 22) may be characterized as being "substantially parallel" to one another and/or the longitudinal axis of the cable when they have a relatively long lay length or are not stranded, as will be discussed in greater detail below. Similar to the group of optical fibers 26, the strength material 28 (e.g., aramid strands) may be stranded or not stranded.

More specifically and in accordance with the first embodiment of this disclosure, the group of optical fibers 26 (e.g., each of the optical fibers 12, 14, 16, 18, 20, 22) may have a lay length L of greater than or equal to about 160 mm, greater than or equal to about 250 mm, greater than or equal to about 500 mm, or greater than or equal to about 1000 mm or more. For each of the foregoing ranges of the lay length L of the group of optical fibers, the upper end of the range may be infinity (e.g., the group of optical fibers 26 may not be stranded).

Also in accordance with the first embodiment, the strength material 28 or strength members (e.g., aramid strands or fibers) may be arranged around the group of optical fibers 26 with a lay length of greater than or equal to about 130 mm, greater than or equal to about 250 mm, greater than or equal to about 500 mm, or even greater than or equal to about 1000 mm. For each of the foregoing ranges of lay length L of the strength material, the upper end of the range may be infinity (e.g., the strength material 28 may not be stranded).

The lay length of the strength members of the strength material 28 may be about the same as the lay length of the optical fibers 26. Alternatively, the lay length of the strength members of the strength material 28 may be in a range from about half the lay length of the optical fibers 26 to about twice the lay length of the optical fibers 26. For example, if the optical fibers 26 have a lay length of about 300 mm, the lay length of the strength members of the strength material 28 may range from about 150 mm to about 600 mm. In one embodiment, the lay length of the optical fibers 26 is about 250 mm and the lay length of the strength members of the strength material 28 is about 350 mm.

The specific lay lengths mentioned herein may depend on the type of cable being manufactured and any specific details in the design of the cable. For example, the lay lengths may be applicable when the group of optical fibers 26 includes single mode optical fibers and/or multimode optical fibers. The lay length for the strength material 28 may be about the same as the lay length of the group of optical fibers 26, or these lay lengths may vary. For example, the lay length of the strength material that surrounds the group of optical fibers 26 may be greater than any lay length of the group of optical fibers 26.

In accordance with the first embodiment, each of the optical fibers 12, 14, 16, 18, 20, 22 exhibits relatively low attenuation. The low attenuation of the optical fibers 12, 14, 16, 18, 20, 22 may include low intrinsic attenuation and/or low delta attenuation. Intrinsic attenuation refers to optical attenuation exhibited under low stress conditions, such as the attenuation over 1 km of straight optical fiber/cable. For example, each of the optical fibers 12, 14, 16, 18, 20, 22 may have an intrinsic attenuation of less than or equal to about 3.0 dB/km.

Delta attenuation refers to optical attenuation exhibited when the optical fiber/cable is subjected to certain stress conditions, such as crushing forces, bending forces, tensile forces, bend performance tests, crush performance tests, or tensile tests. As an example for delta attenuation, for each of the optical fibers 12, 14, 16, 18, 20, 22 in isolation, when wrapped one turn around a 7.5 mm mandrel, the optical fiber may have a delta attenuation of less than or equal to about 0.6 dB, less than or equal to about 0.2 dB, or less than or equal to about 0.08 dB.

In accordance with the first embodiment, each of the optical fibers 12, 14, 16, 18, 20, 22 is a tight buffered low attenuation optical fiber. In one specific example, the low attenuation optical fibers 12, 14, 16, 18, 20, 22 may be ClearCurve® brand multimode optical fibers, or more specifically tight buffered ClearCurve® brand multimode optical fibers, available from Corning Cable Systems of Hickory, N.C., and Corning Inc., of Corning, N.Y., although other suitable optical fibers may be used, such as ClearCurve® brand single mode optical fibers.

As schematically shown in FIG. 1, each of the tight buffered low attenuation optical fibers 12, 14, 16, 18, 20, 22 includes a tight buffer extending around a low attenuation optical fiber. For each of the optical fibers 12, 14, 16, 18, 20, 22, the tight buffer is typically a substantially cylindrical, outer extrusion of polymeric material (e.g., PVC) that extends substantially coaxially around and is fixedly connected to the central low attenuation optical fiber.

Figure 3:
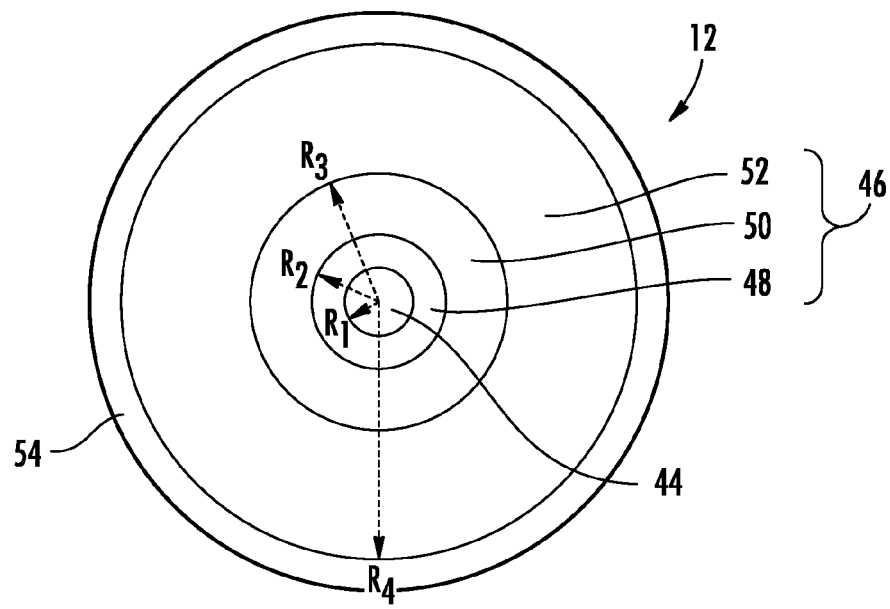
FIG. 3 is an isolated, schematic cross-sectional view of a low attenuation optical fiber of the optical fibers of FIGS. 1 and 2, wherein the cross section is perpendicular to the length of the low attenuation optical fiber.

FIG. 3 is an isolated, schematic cross-sectional view of the low attenuation optical fiber 12 without its outer tight buffer, or showing the outer tight buffer with a reduced thickness, in accordance with the first embodiment. In accordance with the first embodiment, the following discussion of the low attenuation optical fiber 12 is applicable to each of the other optical fibers 14, 16, 18, 20, 22. Whereas a specific example of a suitable low attenuation optical fiber 12 is described in the following, any other suitable optical fibers may be used.

The low attenuation optical fiber 12 includes a core 44 and a cladding 46 that surrounds and is directly adjacent to the core 44. The cladding 46 includes an inner layer 48, a middle layer 50, and an outer layer 52. In some embodiments, the cladding 46 may have an overall radius of about 125 μm.

Generally, the index of refraction of the core 44 is graded from a high index of refraction at a central point to a medium index at an outer point. For example, the core 44 may comprise a graded glass or other suitable material for radially varying the index of refraction. The inner layer 48 includes a medium index of refraction, the middle layer 50 includes a low or depressed index or refraction, and the outer layer 52 includes a medium index of refraction. To achieve a low index of refraction, the middle layer 50 may comprise, for example, fluorine, boron, combinations of fluorine and boron, glass having a plurality of voids, glass doped with one or more down-dopants, such as fluorine, boron, or mixtures thereof, or other compositions or mixtures. In some embodiments, the depressed-index of the middle layer 50 of the cladding 46 may be spaced apart from the core 44 by the inner layer 48.

The middle layer 50 may have a width of at least about 1 μm and may comprise a substantially consistent material composition throughout, such that its refractive index may vary by less than about 0.2% across its width. The middle layer 50 may be spaced from the core 44 by the inner layer 48 or other suitable gap of at least about 0.5 μm. Therefore, the width of the inner layer 48 may be at least about 0.5 μm.

To achieve a low attenuation, the core 44 may be configured with a relatively high index of refraction, the inner layer 48 may be configured with a medium index of refraction, the middle layer 50 may be configured with a relatively low index of refraction, and the outer layer 52 may be configured with a medium index of refraction. The composition of the low attenuation optical fibers 12 exhibits a low amount of intrinsic optical attenuation and a low amount of delta attenuation even when bent.

The core 44 may have a graded index of refraction in which the index of refraction varies in a gradual, linear, exponential, or other manner from a centermost portion of the core 44 to an outermost portion of the core 44. In some implementations, the refractive index profile of the core 44 can have a parabolic or other curved shape. The middle layer 50 of the cladding 46 may comprise a refractive index relatively depressed compared with the inner layer 48 and outer layer 52 of the cladding 46. Also, the depressed-index middle layer 50 may have a refractive index delta less than about 0.2% along its width when its width is at least about 1 μm.

In some embodiments, the low attenuation optical fiber 12 may be constructed as a single-mode fiber (SMF), which limits the light that can enter the fiber to a single mode (or self-consistent electric field distribution). As an example, the core 44 of an SMF may have a diameter of about 8-9 μm. In some embodiments, the low attenuation optical fiber 12 may be constructed as a multi-mode fiber (MMF), which receives light from multiple angles to allow multiple modes of light. As an example, the core 44 of a MMF may have a diameter of about 50 μm, 62.5 μm, 100 μm, or other suitable diameter. For MMF, the diameter of the core 44 of the low attenuation optical fiber 12 may be about 50 μm.

In some embodiments, the cladding 46 may contain voids. The voids according to various implementations may be non-periodically or randomly located within the middle layer 50. Also, the size, shape, and distribution of the voids may be variable. In some embodiments, the voids may extend less than one meter along the length of the low attenuation optical fiber 12.

The low attenuation optical fiber 12 disclosed herein exhibits very low bend-induced optical attenuation, in particular very low macro-bending induced optical attenuation. In some embodiments, high bandwidth is provided by low maximum relative refractive index in the core 44, and low bend losses are also provided.

The low attenuation optical fiber 12 may further exhibit a one-turn, 10 mm diameter mandrel wrap optical attenuation increase of less than or equal to about 0.4 dB/turn at 850 nm, a numerical aperture (NA) of greater than 0.14, greater than 0.17, greater than 0.18, or even greater than 0.185, and an overfilled bandwidth greater than 1.5 GHz-km at 850 nm.

The core 44 may be configured to provide an overfilled (OFL) bandwidth of greater than 1.5 GHz-km, greater than 2.0 GHz-km, greater than 3.0 GHz-km, or even greater than 4.0 GHz-km at an 850 nm wavelength. These high bandwidths can be achieved while still maintaining a one-turn, 10 mm diameter mandrel wrap optical attenuation increase at an 850 nm wavelength of less than 0.5 dB, less than 0.3 dB, less than 0.2 dB, or even less than 0.15 dB. These high bandwidths can also be achieved while also maintaining a one-turn, 20 mm diameter mandrel wrap optical attenuation increase at an 850 nm wavelength of less than 0.2 dB, less than 0.1 dB, or even less than 0.05 dB, and a one-turn, 15 mm diameter mandrel wrap optical attenuation increase at an 850 nm wavelength, of less than 0.2 dB, less than 0.1 dB, or even less than 0.05 dB.

The low attenuation optical fiber 12 is further capable of providing a numerical aperture (NA) greater than 0.17, greater than 0.18, or even greater than 0.185. The low attenuation optical fiber 12 is further simultaneously capable of exhibiting an OFL bandwidth at 1300 nm which is greater than about 500 MHz-km, greater than about 600 MHz-km, or even greater than about 700 MHz-km. Such low attenuation optical fiber 12 are further simultaneously capable of exhibiting minimum calculated effective modal bandwidth (Min EMBc) of greater than about 1.5 MHz-km, greater than about 1.8 MHz-km, or even greater than about 2.0 MHz-km at 850 nm.

When configured as a MMF, the low attenuation optical fiber 12 disclosed herein exhibits a spectral optical attenuation of less than 3 dB/km at 850 nm, less than 2.5 dB/km at 850 nm, less than 2.4 dB/km at 850 nm, or even less than 2.3 dB/km at 850 nm. The MMF fibers disclosed herein exhibit a spectral optical attenuation of less than 1.0 dB/km at 1300 nm, less than 0.8 dB/km at 1300 nm, or even less than 0.6 dB/km at 1300 nm. In some embodiments, the NA of the low attenuation optical fiber 12 is less than 0.23 and greater than 0.17 or even greater than 0.18, or even less than 0.215 and greater than 0.185.

Figure 4:
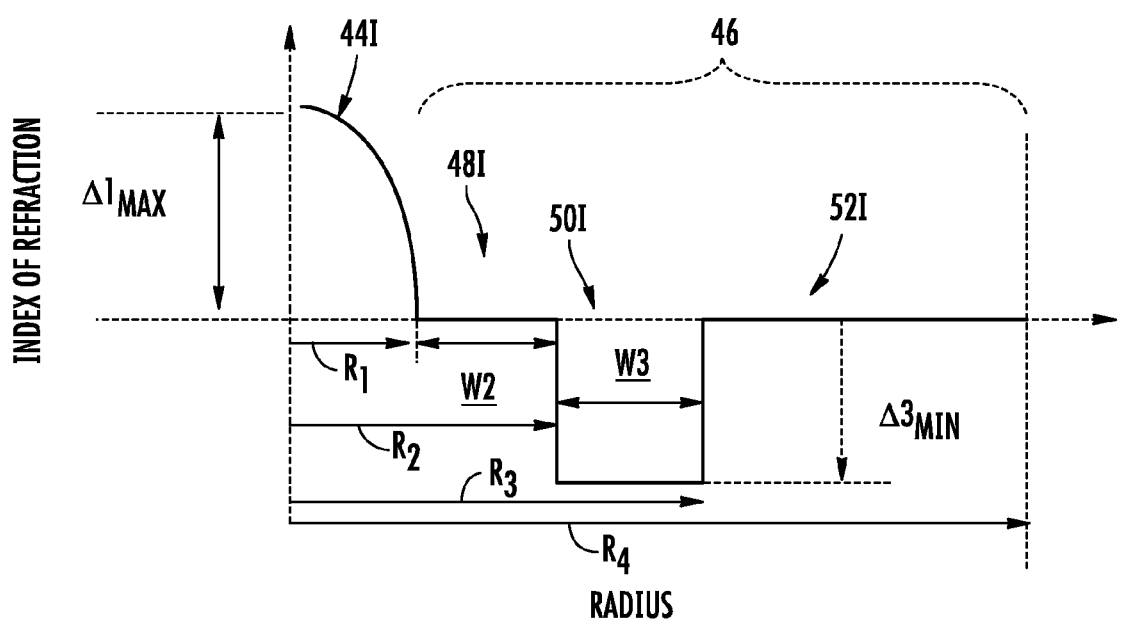
FIG. 4 is a graph illustrating the refractive indices of the different concentric layers of the low attenuation optical fiber of FIG. 3.

FIG. 4 is a graph 56 illustrating a schematic representation of a refractive index profile of the concentric layers of the low attenuation optical fiber 12 shown in FIG. 3, in accordance with the first embodiment. The graph 56 shows the index of refraction of the low attenuation optical fiber 12 at different radii from a central point of the low attenuation optical fiber 12. A first radius $R_1$ represents the core 44, a second radius $R_2$ extends to the outer surface of the inner layer 48 of the cladding 46, and so on. The portion of the graph 56 representing the index of refraction of the core 44 is referenced as 44I, the portion of the graph representing the index of refraction of the inner cladding layer 48 is referenced as 48I, and so on.

As illustrated, the depressed-index middle layer 50I is offset from the core 44I and is surrounded by outer layers 48I and 52I. In some embodiments, the core 44 extends radially outwardly from a centerline to a radius R1, wherein 10≦R1≦40 μm, or 20≦R1≦40 μm. In some embodiments, 22≦R1≦34 μm. In some embodiments, the radius of the core 44 is between about 22 to 28 μm. In some embodiments, the radius of the core 44 is between about 28 to 34 μm.

In some embodiments, the core has a maximum relative refractive index delta less than or equal to 1.2% and greater than 0.5% or even greater than 0.8%. In other embodiments, the core has a maximum relative refractive index delta less than or equal to 1.1% and greater than 0.9%.

In some embodiments, the optical fiber 12 exhibits a 1 turn, 10 mm diameter mandrel optical attenuation increase of no more than 1.0 dB, no more than 0.6 dB, no more than 0.4 dB, no more than 0.2 dB, or even no more than 0.1 dB, at all wavelengths between 800 nm and 1400 nm.

Referring again to FIG. 4, the core 44 and cladding 46 may contain glass or other suitable optically transparent material. The core 44 has radius $R_1$ and a maximum refractive index delta Δ1MAX. The inner layer 48 has width W2 (equal to $R_2$–$R_1$) and outer radius $R_2$. Middle layer 50 has a minimum refractive index delta percent Δ3MIN, width W3 (equal to $R_3$–$R_2$) and outer radius $R_3$. As illustrated, the middle layer 50 is offset or spaced away from the core 44 by the inner layer 48. The middle layer 50 surrounds and contacts the inner layer 48. The outer layer 52 surrounds and contacts the middle layer 50.

As best understood with reference to FIG. 3, the cladding 46 is surrounded by at least one coating 54, which may in some embodiments comprise a low modulus primary coating and a high modulus secondary coating. The coating 54 is typically surrounded by the tight buffer (not shown in FIG. 3) that is typically an outermost extrusion of polymeric material (e.g., PVC) that extends around and is fixedly connected to the coating 54. Alternatively, the coating 54 may be thicker than shown in FIG. 3, such that the coating is the outermost tight buffer. That is, the coating 54 may be characterized as schematically illustrating the outermost tight buffer. The outermost tight buffer typically has an outer diameter of about 0.9 mm.

In some embodiments, the inner layer 48 has a refractive index profile $\Delta 2(r)$ with a maximum relative refractive index Δ2MAX, and a minimum relative refractive index Δ2MIN, and in some embodiments Δ2MAX=Δ2MIN. The depressed-index layer 50 has a refractive index profile $\Delta 3(r)$ with a minimum relative refractive index Δ3MIN. The outer layer 52 has a refractive index profile $\Delta 4(r)$ with a maximum relative refractive index Δ4MAX, and a minimum relative refractive index Δ4MIN, where in some embodiments Δ4MAX=Δ4MIN. In some embodiments, Δ1MAX>Δ2MAX>Δ3MIN. In some embodiments, the inner layer 48 has a substantially constant refractive index profile with a constant $\Delta 2(r)$; in some embodiments, $\Delta 2(r)$=0%. The outer layer 52 may have a substantially constant refractive index profile, with a constant $\Delta 4(r)$; in some of these embodiments, $\Delta 4(r)$=0%.

The core 44 may have an entirely positive refractive index profile, where $\Delta 1(r)$>0%. R1 is defined as the radius at which the refractive index delta of the core 44 first reaches a value of 0.05% or other value, going radially outwardly from the centerline. In some embodiments, the core 44 contains little or no fluorine. In some embodiments, the inner layer 48 may have a relative refractive index profile $\Delta 2(r)$ having a maximum absolute magnitude less than 0.05%, and Δ2MAX<0.05% and Δ2MIN>–0.05%, and the depressed-index layer 50 begins where the relative refractive index of the cladding first reaches a value of less than –0.05%, going radially outwardly from the centerline. In some embodiments, the outer layer 52 has a relative refractive index profile $\Delta 4(r)$ having a maximum absolute magnitude less than 0.05%, and Δ4MAX<0.05% and Δ4MIN>–0.05%, and the depressed-index layer 50 ends where the relative refractive index of the cladding first reaches a value of greater than –0.05%, going radially outwardly from the radius where Δ3MIN is found.

Examples of methods for manufacturing cable 24 are described in the following, in accordance with the first embodiment of this disclosure. Initially, the optical fibers 12, 14, 16, 18, 20, 22 may be brought together to form the group of optical fibers 26. For example, the optical fibers 12, 14, 16, 18, 20, 22 may be stranded together with a lay length (e.g., a lay length of greater than or equal to about 160 mm, greater than or equal to 250 mm, greater than or equal to 500 mm, or greater than or equal to about 1000 mm or more). As another example, the optical fibers 12, 14, 16, 18, 20, 22 may be stranded together with a lay length that approaches infinity, so that they are in a substantially parallel arrangement with one another. Any stranding of the group of optical fibers 26 may be done around a central portion or part of the strength material 28 (e.g., a central strength member). As still another example, the optical fibers 12, 14, 16, 18, 20, 22 may be brought together so that they are not stranded together, so that they are in a substantially parallel arrangement with one another.

The group of optical fibers 26 may be surrounded with the strength material 28 (e.g., the outer portion of the strength material), such as by stranding the strength material around the group of optical fibers. For example, the strength material 28 may be stranded around the group of optical fibers 26 with a lay length (e.g., the strength material 28 may have a lay length of greater than or equal to about 130 mm, greater than or equal to about 250 mm, greater than or equal to about 500 mm, or even greater than or equal to about 1000 mm). As another example, the strength material 28 may be stranded around the group of optical fibers 26 with a lay length that approaches infinity, so that the strength members are in a substantially parallel arrangement with one another. As still another example, strength material 28 may be arranged around the group of optical fibers 26 in a manner such that the strength material is not stranded, so that the strength members are in a substantially parallel arrangement with one another.

The polymeric jacket 31 is typically extruded around the strength member 28. Any suitable jacket 31 may be used. For example, the jacket 32 may be configured to meet certain standards, fire codes, burn codes, or other regulations, such as those for defining the acceptable materials and construction of fiber optic cables for use in plenum spaces or riser spaces. The jacket 31 may include or consist essentially of a polymer material that meets burn rating standards for low-smoke zero-hydrogen (LSZH). The rip cord 30 may be optional. If the rip cord 30 is included, typically the polymeric jacket 31 is extruded around the rip cord so that the rip cord is adjacent the inner surface of the jacket.

In accordance with one aspect of the first embodiment, production speed may be increased by arranging the optical fibers 12, 14, 16, 18, 20, 22 and the strength members of the strength material 28 substantially in parallel with one another. Usually, the line speed (i.e., the speed at which the optical fibers, strength material and other materials are joined together to form a cable) is limited by the rotational speed of stranding machinery used to strand the optical fibers and strength material. In accordance with one aspect of the first embodiment, a cable (e.g., the cable 24) with a greater lay length (e.g., of the optical fibers and strength material) may be manufactured more quickly because there is less stranding to be performed.

Sometimes the line speed is limited by the aramid server, which feeds the aramid material (e.g., the strength material 28) to the cable. Some aramid servers can run at speeds of up to about 120 RPM. If the lay length of the aramid strength material 28 is about 250 mm, the cable can be manufactured at about 30 meters per minute. If the lay length of the aramid strength material 28 is 1000 mm, for example, the line speed may be about 120 meters per minute—a fourfold increase in production.

Examples of methods of using the cable 24 are discussed in the following, in accordance with the first embodiment of this disclosure. When the cable 24 is installed, it may be bent. For example, the cable 24 may tolerate bending to a bend radius of at least about five times, or at least about three times, the diameter of the fiber optic cable without significant optical attenuation. The substantially parallel arrangement of the optical fibers of the optical fibers 26 may help to reduce optical attention when the optical cable 24 is bent by allowing the optical fibers to move into a somewhat flattened arrangement, such that each fiber exerts relatively less crushing forces to the other optical fibers.

Figure 5:
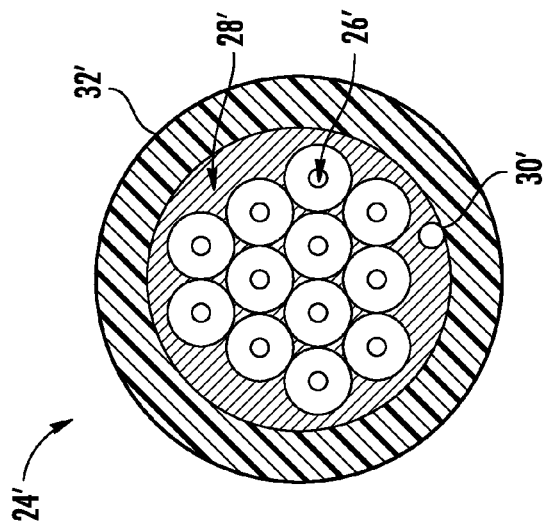
FIG. 5 is a schematic cross-sectional view of a fiber optic cable according to a second embodiment of this disclosure, wherein the cross section is perpendicular to the length of the fiber optic cable.

Although cable 24 is illustrated with six optical fibers 26, any suitable number of optical fibers may be incorporated within cable 24. For example, some embodiments may include up to twelve or twenty-four optical fibers in a unit. As one specific example, FIG. 5 is a schematic cross-sectional view of a fiber optic cable 24'according to a second embodiment of this disclosure. The cable 24' of the second embodiment is like the cable 24 of the first embodiment, except for variations noted and variations that will be apparent to one of ordinary skill in the art. For example, in the cable 24' of the second embodiment, strength material 28' surrounds a group of optical fibers 26', and a jacket 32' surrounds the strength material 28' and a ripcord 30'.

Although the cable 24' is illustrated with the group of optical fibers 26' including twelve optical fibers, any suitable number of optical fibers (e.g., twenty-four optical fibers) may be incorporated within the cable 24'. The group of optical fibers 26' has a dual-layer arrangement in that it includes an inner layer of optical fibers (e.g., three inner optical fibers) and an outer layer of optical fibers (e.g., nine outer optical fibers). In accordance with the second embodiment, the outer layer of the optical fibers is positioned immediately adjacent to the inner layer of optical fibers, which may help to reduce the diameter of the cable 24'. For example and in accordance with the second embodiment, the strength material 28' is not positioned between the inner and outer layers of the optical fibers. As a result, when the cable 24' is bent, the optical fibers therein may be relatively easily displaced to form a flattened configuration at the bend. When flattened, the optical fibers of the inner and outer layers may intermingle in a manner that seeks to minimize crushing forces and attenuation. Compactness stemming from the strength material 28 not being positioned between the inner and outer layers of the optical fibers may result in allowing the jacket 32' to include a reduced amount of material without affecting a burn rating of the jacket. Alternatively, some of the strength material 28 may be positioned between the inner and outer layers of the optical fibers.

The group of optical fibers 26' may not be stranded, or it may be stranded as discussed above for the first embodiment. In addition and in accordance with the second embodiment, the inner layer of optical fibers may not be stranded or may be stranded with any of the lay lengths discussed above for the group of optical fibers 26 of the first embodiment, and the outer layer of optical fibers may not be stranded or may be stranded around the inner layer of optical fibers with any of the lay lengths discussed above for the group of optical fibers 26 of the first embodiment.

In accordance with one aspect of the first and second embodiments of this disclosure, one or more of the above-discussed features seek to inhibit attenuation in a manner that allows for the jackets 32, 32' (FIGS. 1 and 5) to be relatively tight, without the tight jackets causing excessive attenuation. For example, the jackets 32, 32' may be extruded to a greater tightness than is typical in order to reduce the overall size of the cables 24, 24' and to reduce the amount of material needed for the jackets. A tight jacket may be applied by way of pressure extrusion, which causes the tight jacket to constrict against and compress against the strength material. In this respect, the cost savings of using a tight jacket on a twelve-fiber indoor cable, for example, may be about $2/km for riser cables and about $6/km for plenum cables. The jackets 32, 32' being relatively tight is optional. That is, in some versions of the first and second embodiments, the tightness/looseness of the jackets 32, 32' may be conventional. Whereas having a tight jacket has some manufacturing advantages, having a tight jacket may cause increased optical attenuation because a tight jacket may limit the movement of the optical fibers when the cable is bent, such as when the cable is wrapped around a mandrel or even when wrapped on a reel.

Figure 6:
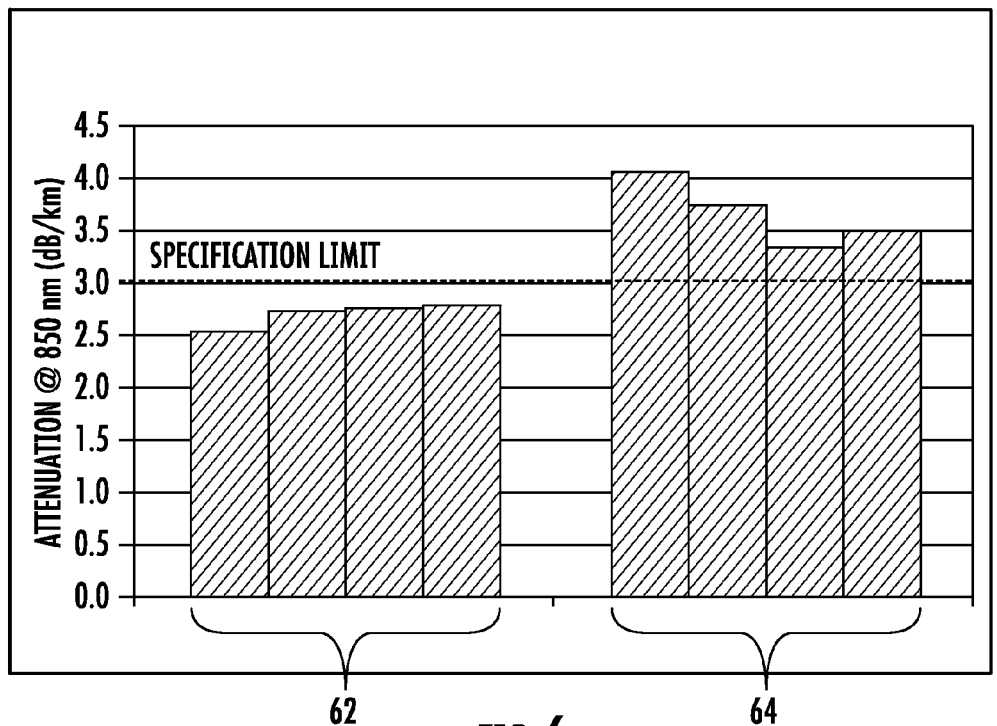
FIG. 6 is a chart illustrating differences between the intrinsic optical attenuation of different types of optical fibers stranded in a tightly-jacketed comparative cable that is in some ways similar to the cable of FIG. 3.

FIG. 6 is a chart illustrating differences between the intrinsic optical attenuation of different types of optical fibers stranded in a comparative cable (not shown) with a relatively tight jacket. The tightly-jacketed comparative cable is in some ways similar to the cable 24' (FIG. 5) of the second embodiment of this disclosure, except that in addition to including four low attenuation optical fibers (i.e., "bend insensitive" 50 μm multimode optical fibers that may be used in the groups of optical fibers 26, 26' of the first and second embodiments) it includes four regular attenuation optical fibers (i.e., standard 50 μm multimode optical fibers).

The chart of FIG. 6 shows the optical attenuation (or loss of light) in decibels per kilometer (dB/km) of light having a wavelength of 850 nm. FIG. 6 shows results 62 for the four low attenuation optical fibers of the tightly-jacketed comparative cable. FIG. 6 also shows results 64 for the four regular attenuation optical fibers of the tightly-jacketed comparative cable. Even with the tight jacket, it can be observed from FIG. 6 that the four low attenuation optical fibers of the tightly-jacketed comparative cable exhibit lower intrinsic optical attenuation than that exhibited by the four regular attenuation optical fibers of the tightly-jacketed comparative cable.

Figure 7:
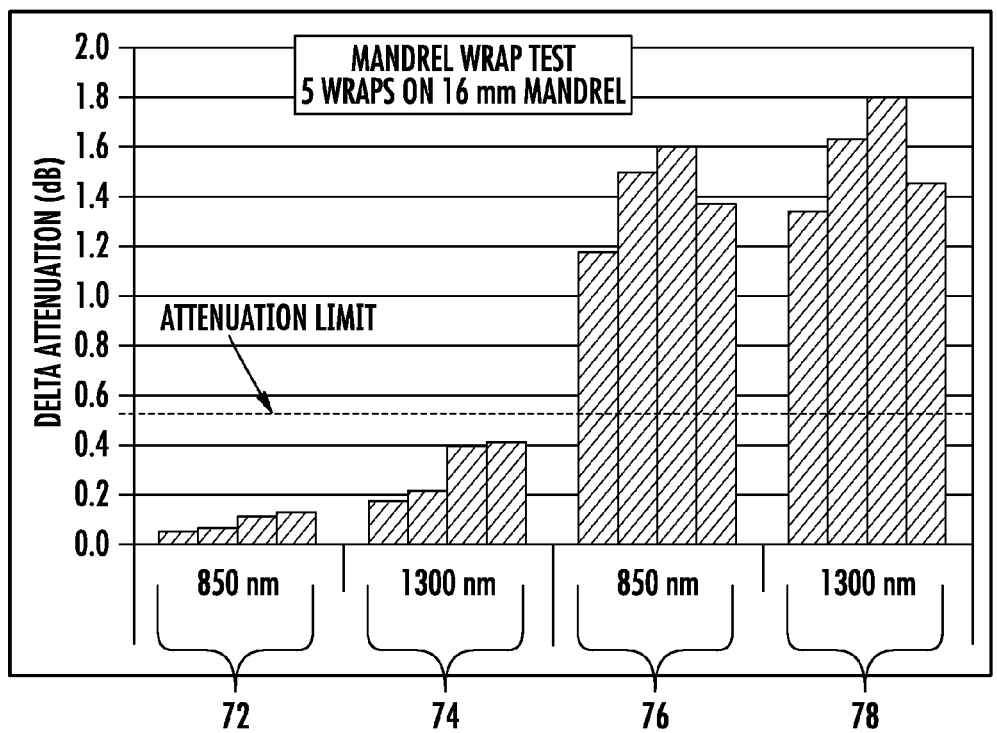
FIG. 7 is a chart illustrating changes in optical attenuation that occur when the tightly-jacketed comparative cable is wrapped.

FIG. 7 is a chart illustrating changes in optical attenuation that occurred when the tightly-jacketed comparative cable was wrapped five times around a 16 mm mandrel. In FIG. 7, the first group of measurements 72 and second group of measurements 74 represent the delta attenuation exhibited by the four low attenuation optical fibers of the tightly-jacketed comparative cable. In FIG. 7, the third and fourth groups of measurements 76, 78 represent the delta attenuation exhibited by the four regular attenuation optical fibers of the tightly-jacketed comparative cable. The first and third groups of measurements 72, 76 were made with 850 nm light transmitted through the tightly-jacketed comparative cable. The second and fourth groups of measurements 74, 78 were made with 1300 nm light transmitted through the tightly-jacketed comparative cable.

Each of the cables 24, 24' may be characterized as being a unit, and two or more of the units may be combined into a single cable to provide cables with higher fiber counts.

Throughout the foregoing disclosure, the adjective "about" has been used in numerous locations preceding an amount. Other embodiments of this disclosure are like the above-discussed embodiments, except that the adjective "about" is optional and may be omitted.

It will be apparent to those skilled in the art that various modifications and variations can be made without departing from the spirit or scope of the invention.

What is claimed is:

1. A fiber optic cable, comprising:
    a plurality of optical fibers, wherein any lay length of the optical fibers is greater than or equal to about 500 mm;
    strength material surrounding the plurality of optical fibers, wherein any lay length of the strength material is greater than or equal to about 500 mm; and
    a polymer jacket surrounding the strength material;
    wherein, when wrapped one turn around a 10 mm diameter mandrel, each of the optical fibers is configured to exhibit a bend-induced optical attenuation of less than 0.5 dB at an 850 nm wavelength.

2. The fiber optic cable of claim 1, wherein the strength material comprises strength members that are substantially parallel to one another, and wherein the plurality of optical fibers are substantially parallel to one another.

3. The fiber optic cable of claim 1, wherein the strength material is stranded around the plurality of optical fibers.

4. The fiber optic cable of claim 1, wherein the plurality of optical fibers is stranded.

5. The fiber optic cable of claim 1, wherein, when wrapped one turn around a 10 mm diameter mandrel, each of the optical fibers is configured to exhibit a bend-induced optical attenuation of less than 0.2 dB at an 850 nm wavelength.

6. The fiber optic cable of claim 1, wherein each of the optical fibers is a tight-buffered optical fiber.

7. The fiber optic cable of claim 1, wherein the strength material comprises aramid fibers.

8. A fiber optic cable, comprising:
    a plurality of tight-buffered optical fibers having a lay length of greater than 1000 mm, wherein each optical fiber comprises a core and a cladding that surrounds and is directly adjacent to the core, wherein the cladding of each optical fiber is surrounded by at least one coating, wherein the coating is surrounded by the tight buffer, and wherein the tight buffer of each optical fiber is a substantially-cylindrical, outer layer of polymeric material that extends substantially coaxially around and is fixedly connected to the corresponding optical fiber;
    strength material surrounding the plurality of tight-buffered optical fibers; and
    a polymer jacket surrounding the strength material;
    wherein, when wrapped one turn around a 10 mm diameter mandrel, each of the tight buffered optical fibers is configured to exhibit a bend-induced optical attenuation of less than 0.5 dB at an 850 nm wavelength.

9. The fiber optic cable of claim 8, wherein the plurality of tight-buffered optical fibers are substantially parallel to one another, and wherein the strength material comprises strength members that are substantially parallel to one another.

10. The fiber optic cable of claim 9, wherein the strength material comprises aramid fibers and has a lay length greater than or equal to about 1000 mm.

11. A fiber optic cable, comprising:
    a plurality of tight-buffered optical fibers having a lay length of greater than 500 mm, wherein the tight buffer of each optical fiber is a substantially-cylindrical, outer layer of polymeric material that extends substantially coaxially around and is fixedly connected to the corresponding optical fiber, wherein
        a first group of the tight-buffered optical fibers resides within an inner layer and
        a second group of the tight-buffered optical fibers resides within an outer layer; and
        the first group is adjacent to the second group;
    strength material surrounding the plurality of tight-buffered optical fibers; and
    a polymer jacket surrounding the strength material;
    wherein, when wrapped one turn around a 10 mm diameter mandrel, each of the tight-buffered optical fibers is configured to exhibit a bend-induced optical attenuation of less than 0.5 dB at an 850 nm wavelength.

12. The fiber optic cable of claim 11, wherein the polymeric material of the tight buffer is polyvinyl chloride.

13. The fiber optic cable of claim 11, wherein when flattened, the optical fibers of the inner and outer layers intermingle to minimize crushing forces and attenuation.

14. The fiber optic cable of claim 11, wherein the inner layer comprises three inner optical fibers and the outer layer comprises nine outer optical fibers.

15. The fiber optic cable of claim 11, wherein strength material is not positioned between the inner and outer layers of optical fibers, whereby, when the cable is bent, the optical fibers there are easily displaced to form a flattened configuration at the bend.

16. The fiber optic cable of claim 11, wherein the outer layer of the optical fibers is positioned immediately adjacent to and surrounding the inner layer of optical fibers, thereby helping to reduce the diameter of the cable.

* * * * *